(12) United States Patent
Baisley et al.

(10) Patent No.: US 6,453,324 B1
(45) Date of Patent: Sep. 17, 2002

(54) METHOD FOR MAINTAINING A VERSION HISTORY OF OBJECTS IN A REPOSITORY

(75) Inventors: Donald Edward Baisley, Laguna Hills, CA (US); Peter Johnson, Foothill Ranch, CA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/539,260

(22) Filed: Mar. 30, 2000

(51) Int. Cl.[7] .............................................. G06F 17/30
(52) U.S. Cl. ...................................................... 707/203
(58) Field of Search ........................ 707/103, 200–203, 707/204

(56) References Cited

U.S. PATENT DOCUMENTS

| | | | | |
|---|---|---|---|---|
| 5,347,653 A | * | 9/1994 | Flynn et al. ................. 707/203 |
| 5,440,730 A | * | 8/1995 | Elmasri et al. .............. 707/203 |
| 5,504,879 A | * | 4/1996 | Eisenberg et al. .......... 707/100 |
| 5,574,898 A | * | 11/1996 | Leblang et al. ................. 707/1 |
| 5,581,755 A | * | 12/1996 | Koerber et al. .......... 707/103 R |
| 5,617,398 A | * | 4/1997 | Lee et al. .................. 369/110.04 |
| 5,649,200 A | * | 7/1997 | Leblang et al. .............. 707/203 |
| 5,701,472 A | * | 12/1997 | Koerber et al. .............. 707/203 |
| 5,758,348 A | * | 5/1998 | Neubauer ................ 707/103 R |
| 5,813,017 A | * | 9/1998 | Morris ........................ 707/203 |
| 5,893,909 A | * | 4/1999 | Nomura et al. ............. 707/203 |
| 5,950,210 A | * | 9/1999 | Nelson ........................... 707/1 |
| 6,023,710 A | * | 2/2000 | Steiner et al. .............. 707/204 |
| 6,209,000 B1 | * | 3/2001 | Klein et al. ............. 707/104.1 |
| 6,324,535 B1 | * | 11/2001 | Bair et al. .................... 345/419 |
| 6,393,438 B1 | * | 5/2002 | Kathrow et al. .............. 705/54 |
| 6,415,299 B1 | * | 7/2002 | Baisley et al. .............. 707/101 |

* cited by examiner

Primary Examiner—Safet Metjahic
Assistant Examiner—Hanh B. Thai
(74) Attorney, Agent, or Firm—Alfred W. Kozak; Mark T. Starr; Lise A. Rode (57) ABSTRACT

An improved computer-implemented method is disclosed, which maintains a version history of objects in a repository. Modifications to property values and links are tracked with respect to versions of a model. The method includes the steps of maintaining a start version and a list of end versions for each object in the model and maintaining a start version and a list of end versions for each attribute value in the model. Moreover, in response to a request for objects in a class with respect to a current version, only those objects whose start version is in the history of the current version and whose end versions are not in the history of the current version are retrieved. Also, in response to a request for attribute values of an object with respect to a current version, only those values whose start version is in the history of the current version and whose end versions are not in the history of the current version are retrieved.

19 Claims, 12 Drawing Sheets

METHOD FOR MAINTAINING A VERSION HISTORY OF OBJECTS IN A REPOSITORY

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates in general to the field of object-oriented programming and in particular to a method for readily maintaining a version history of objects and object models in a repository storing such object models.

BACKGROUND OF THE INVENTION

The storage and manipulation of data records or objects within a database application is well known in the prior art. A database allows one to store information in it; and it does not necessarily have any special meaning associated with the things that are stored in the database. A repository not only uses the database as a data store, but it is a layer above a database. A repository has information about the things stored in the database. A repository is like a card catalog that is found in the library, with the library being analogous to the database.

With the advent of repositories, improvements in the accessibility of data within databases has improved. However, as these repositories have become larger and more complex a method is required for defining, tracking and maintaining objects and versions thereof in an object oriented repository.

A version service enables users to record changes to objects over time and thus to maintain information about the previous states of these objects. Each of these states is maintained in a separate object in the repository. As the repository is used over time the number of evolutionary states of a versionable object increases. Thus, it becomes more and more difficult to find objects within the version tree as the number of historical states of the object increases. For example, at some point in time a variant branch was created. Over time multiple historical states and later subvariant branches from this branch were created. Consequently, the version tree becomes more and more complex, which increases the complexity of locating a versioned object.

An example of a prior art technique for versioning of objects in an object-oriented repository is disclosed in U.S. Pat. No. 5,671,398, entitled METHOD FOR COLLAPSING A VERSION TREE WHICH DEPICTS A HISTORY OF SYSTEM DATA AND PROCESSES FOR AN ENTERPRISE, U.S. Pat. No. 5,701,472, entitled METHOD FOR LOCATING A VERSIONED OBJECT WITHIN A VERSION TREE DEPICTING A HISTORY OF SYSTEM DATA AND PROCESSES FOR AN ENTERPRISE, both of which are assigned to the assignee hereof. Yet another prior art reference of interest is U.S. Pat. No. 5,504,879 entitled RESOLUTION OF RELATIONSHIP SOURCE AND TARGET IN A VERSIONED DATABASE MANAGEMENT SYSTEM by Neal R. Eisenberg, et al. All of these patents disclose a method for versioning whole objects rather than versioning individual property values as taught by the inventors hereof.

Another prior art method maintains the complete state of the latest version of each object and then maintains partial objects for earlier versions of each object. Such a prior art technique is taught in U.S. Pat. No. 5,347,653 entitled SYSTEM FOR RECONSTRUCTING PRIOR VERSIONS OF INDEXES USING RECORDS INDICATING CHANGES BETWEEN SUCCESSIVE VERSIONS OF THE INDEX by Rex A. Flynn, et al. Like other prior art versioning methods, there is more overhead involved in viewing historical states of objects. Moreover, this prior art method applies a version graph to an individual object rather than to a model as taught by the inventors hereof.

SUMMARY OF THE INVENTION

Accordingly, it is an object of this invention to provide a simplified versioning service for a repository.

Another object of this invention is to provide a method for versioning individual property values rather than whole objects, thereby obviating the necessity of making of a duplicate of an object when versioning it.

Still another object of this invention is to provide a simplified method for versioning objects without the necessity of updating multiple references to a new version of an object.

Yet another object of this invention is to provide a method for versioning, which when following a reference, it is not necessary to filter out versions of objects that are not of interest.

Still another object of this invention is to provide a method for versioning objects wherein the scope of a version graph is an entire model, rather than each object having its own version graph.

Another object of this invention is to provide a method for versioning objects wherein an object retains its identity from one version to the next.

These and other objects will become apparent as the invention is described in detail below. An improved computer-implemented method is provided, which maintains a version history of objects in a repository. Modifications to property values and links are tracked with respect to versions of a model. The method includes the steps of maintaining a start version and a list of end versions for each object in the model and maintaining a start version and a list of end versions for each attribute value in the model. Moreover, in response to a request for objects in a class with respect to a current version, only those objects whose start version is in the history of the current version and whose end versions are not in the history of the current version are retrieved Also, in response to a request for attribute values of an object with respect to a current version, only those values whose start version is in the history of the current version and whose end versions are not in the history of the current version are retrieved.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, each of which can be either an operation or a structural feature. An operation defines an action that an object can perform, or an action that can be performed on the object. For example, "make withdrawal" could be defined as an operation on a customer account object. Structural features indicate the state of an object. Structural features of an object have values, and these values define the state of the object. A structural feature can be either an attribute or a reference. An attribute defines a value that is maintained by the object. For example, "current account balance" could be an attribute of the customer account object. The numeric value for the customer's account balance would be stored in the customer account object. Attributes can be either instance-level or classifier-level. If instance-level, an attribute has separate values for each object in a class. If it is a classifier-level, an attribute has the same values for all members of the class, so it applies once for an entire model rather than separately to each object. A reference is a feature of an object, which relates the object to another object through a link. A link associates two objects. A reference represents a link within the objects it connects. There can be a reference on either end of a link, on both ends, or on neither end. As an example, a link would be used to connect an account object to a separate customer object. The account object could then contain a reference to the customer object, and the customer object could contain a reference to the account object. Some associations define composition, which mean that a link creates an ownership relationship such that one object owns the other.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

A version is an object that can be thought of in two ways. First, a version is a view of a model's state: i.e., what versioned objects exist and what are the values of their structural features? This can be a frozen historical state or a current, or active state. Second, a version can be thought of as a set of changes that create a new state from a previous one. The set of changes can be small or large; or, it can involve a single object or a great number of objects.

A version graph is a model of interrelated versions starting with an initial version, which then links to successive versions either directly or through branches that create alternate paths of modification to the versioned model. The term element as used herein with the phrase within an XML element shall mean all those code terms between brackets as defined by the rules of XML.

Versioning is orthogonal to the metamodels of information that can be versioned. For example, the standard UML metamodel does not address versioning. UML can be deployed in a repository with or without versioning. UML's structure, constraints and methods are the same regardless of versioning.

An object does not change its identity across versions, but its structural features can change. For example, suppose a UML UseCase is created with the name "Correct". In a later version its name is changed to "Revise". The same object exists in both versions. With respect to the later version, asking for the object's name is answered with "Revise". With respect to the earlier version, asking for the same object's name is answered with "Correct". With respect to a version that precedes creation of the UseCase, the object does not exist (as if it had been deleted).

The versioned states of a model include information relating each object, link, and attribute value to the version in which it is created or established, and to the zero of more versions in which it is deleted or removed. A single object, link or attribute value can be deleted or removed in multiple versions because a version graph can support branching. For example, an object created on one version can continue to exist in some branches of the version graph while being deleted in others.

Figure 1:
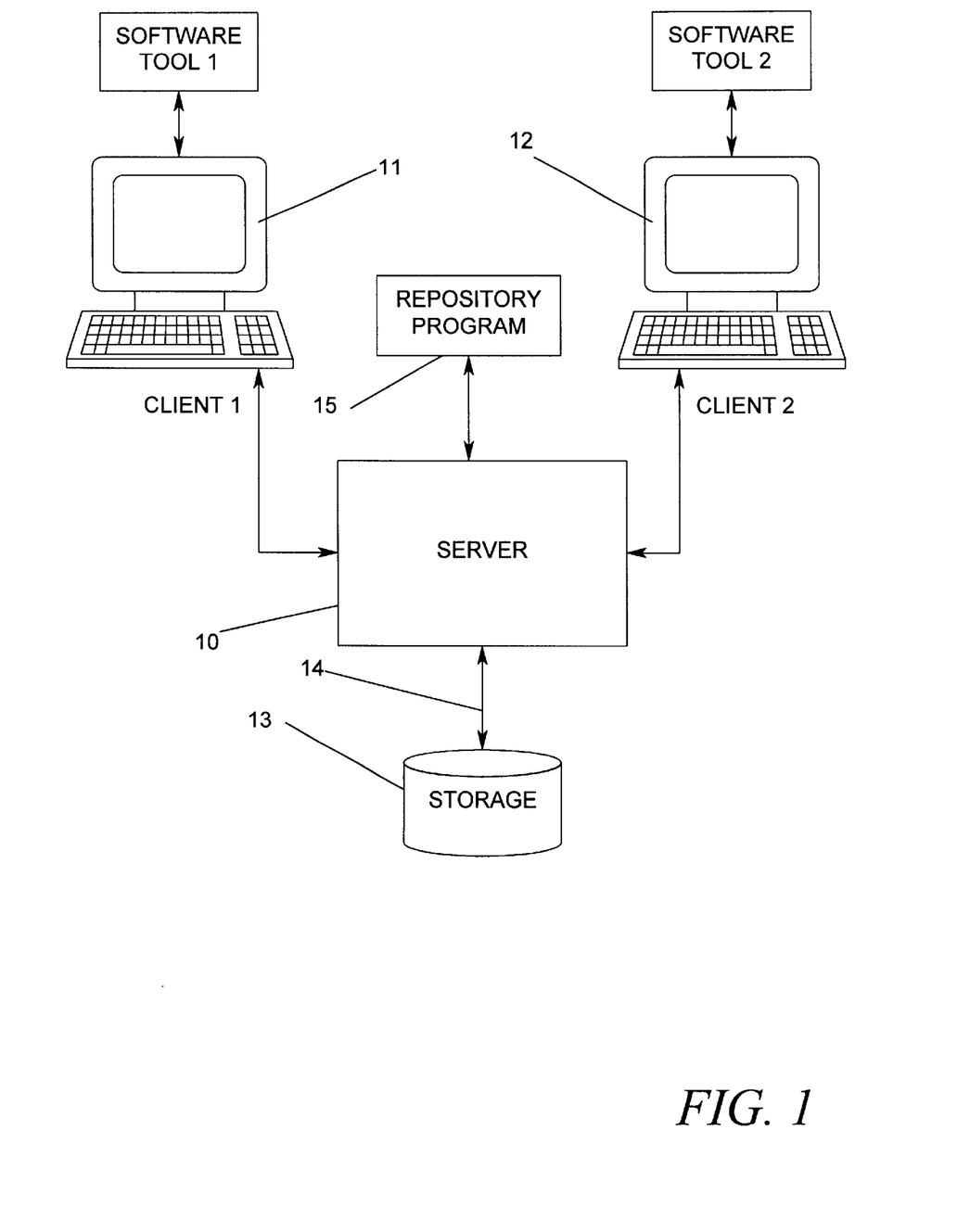
FIG. 1 is a block diagram of a computing system that may employ the method of the present invention.

Referring now to the drawings and FIG. 1 in particular, a block diagram of a system that may execute the method of the present invention is shown. A server computing system 10 is illustrated with a workstation 11 (such as Client 1) and a workstation 12 (such as Client 2) being coupled to the server. It is pointed out that many more workstations may also be coupled to the server 10, and a variety of different networks may be used for this coupling. The server 10 may also include a storage 13 coupled in a conventional manner by means of cabling 14. The storage 13 may be used for storing data useful to the programs being run in the workstations and to the server itself. The workstation 11 may be executing a software modeling tool 1, while the workstation 12 may be executing another or completely different software modeling tool 2. Moreover, the server 10 is capable of executing a repository software program 15.

The repository program 15 further includes tools for cataloging, browsing, and managing components that make up an application. Methods to support these services are disclosed in several patents and patent applications assigned to the assignee of this application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992, for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

One of the requirements of a version service is that when a link is traversed from one object to another the resultant object returned must be the version of the object that belongs to the current version context. This is a feature known as fuzzy pointers. For example, consider the diagram illustrated in FIG. 2A, which is the result of a prior art version service. There are two objects, objA (reference 20) and objB (reference 21). Object objA has a link, called ref (or reference 22), to object objB. Object objB contains an attribute, called x, whose current value is 123. Now consider the situation where the value of the x attribute of object objB is modified and a new version of object B is created (reference 23). With a fuzzy pointer, one can assume that the link named ref (reference 27) is really pointing to an object (ref 24) that encompasses all versions of object objB. When the link is traversed from objA to objB, exactly which object objB (reference 21 or 23) is accessed depends upon the current viewpoint of the user. Such a viewpoint is known as a version context.

Figure 2A:
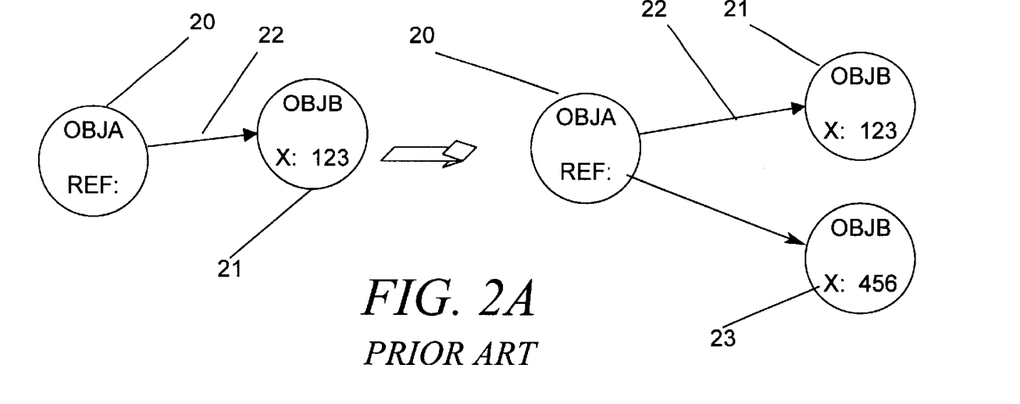
FIG. 2A is a diagram illustrating the concept of versioning as used in the prior art.
Figure 2B:
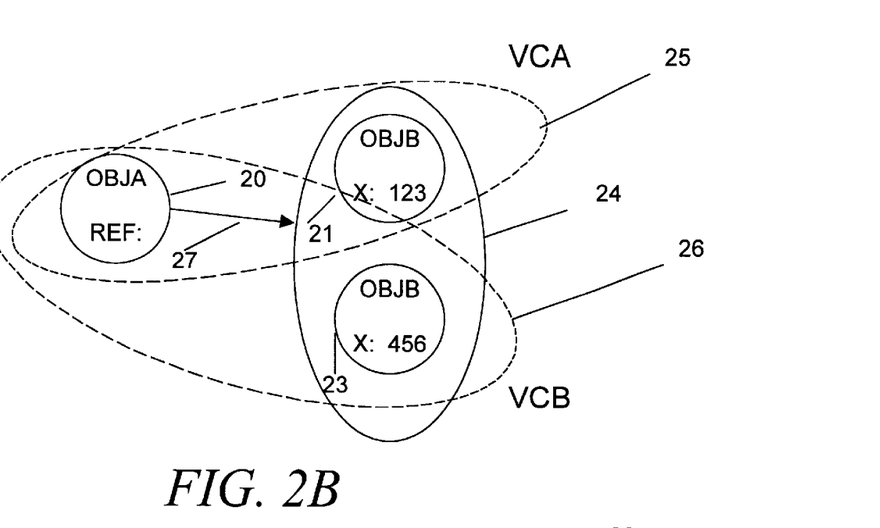
FIG. 2B is a diagram illustrating the concept of versioning as used in the present invention.

Now assume that the original state of the objects, as illustrated in FIG. 2A is in a version context named vcA (reference 25). Also assume that at the time that the value of x is changed, and that the current version context is vcB (reference 26), as shown in FIG. 2B, which illustrates the scope of objects in both version contexts. In the scope of vcA, (reference 25) only the first version of object objB is visible. So in that scope, following the link ref (reference 27) yields the first version on object objB whose attribute x has a value of 123. Similarly, in the scope of version context vcB, only the second version of objB is visible.

It is important to note that all versioned objects in a repository belong to at least one version context, and that a version context contains at most one version of any given object. Thus, object objA belongs to both version contexts vcA and vcB, and each version of object objB belongs to only a single version context (i.e., reference 25 or 26).

While it is convenient to think of objects being versioned as illustrated in FIGS. 2A and 2B, it is technically not correct. The version service of the present invention does not version objects (except for tracking the versions in which objects are created and destroyed), but rather versions property values, and tracks the version contexts in which properties have changed.

Figure 4:
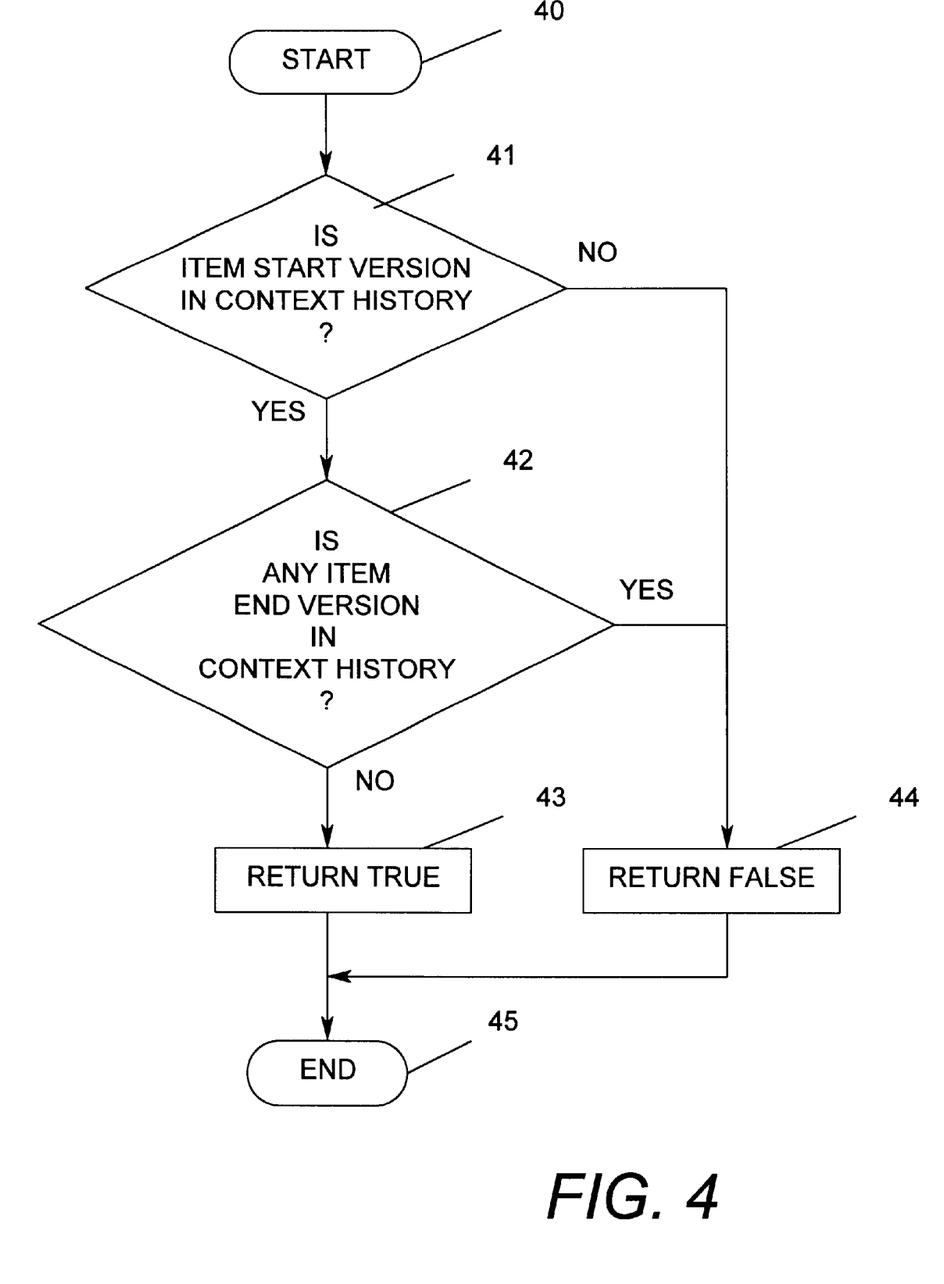
FIG. 4 is a flow chart illustrating the process for determining if an item (e.g., object, association, or attribute value) exists within a context.

Continuing with the discussion of our previous example, after modifying the attribute x of object objB, we really have the objects illustrated in FIG. 4. Notice that there is only one object objB (reference 28), and that it's attribute x has two values. However, each value of x is now a tuple—the value itself and the version context in which the value is present. Thus, following the link 27 named ref from object objA to object objB yields the same object objB no matter what version context defines the current context. However, accessing the value of attribute x will yield different values depending on the current version context.

Note that this means that all properties are physically implemented as being multivalued, even if they are modeled as single-valued. Thus, from a programming point of view, single-valued properties still appear as single-valued, because a property is always accessed from the perspective of a single version context.

Figure 2C:
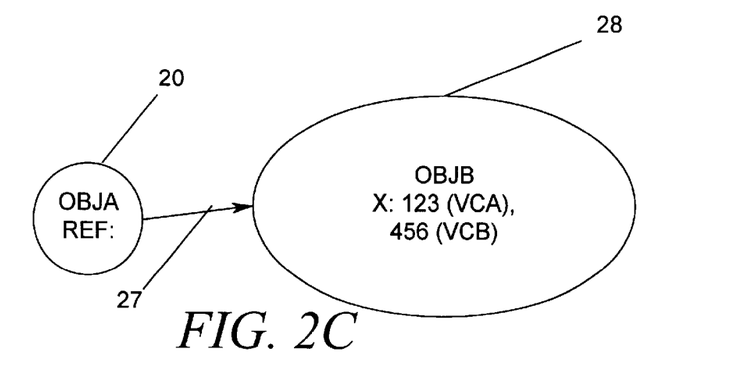
FIG. 2C is a diagram illustrating the same thing as shown in FIG. 2B reduced to a basic format.

Even though the objects illustrated in FIGS. 2B and 2C differ in physical object layout, logically, they are the same. Versioning individual property values rather than whole objects has as its advantages:

it is not necessary to make a duplicate of an object when versioning it;
  it is not necessary to update multiple references to a new version of the object;
  when following a reference, it is not necessary to filter out the versions of objects that are not of interest (in some prior art repositories object objA would reference both versions of objB, leaving the client tool to sort out which is desired).

There is, however a disadvantage:

each property value lookup must search for the correct value for the current version context.

Thus the performance of property value lookup becomes the key issue in versioning properties.

Up to this point, we have assumed the existence of only two version contexts. In reality, a repository might contain hundreds of version contexts. So rather than tracking the value of every property for every version context, which would lead back to versioning objects rather than property values, we track the version context in which a property value was set to a particular value and the version contexts in which that property value is changed. Note that in order to support branching, one must track multiple version contexts where a property changes. Also note that this information applies to attributes as well as references. Similarly, one must track the version context in which an object is first created and the version contexts in which the object is deleted. Each object, link and property value have the following additional information:

TABLE I

Version Tracking Attributes

| Attribute | Cardinality | Description |
| --- | --- | --- |
| startVersion | 1 . . . 1 | Identifies the version context in which the object was created or property value was set. |
| endVersions | 0 . . . n | Identifies the version context(s) in which the object was deleted or the one in which the property value was changed |

Note that this scheme works even for multivalued properties. For example, consider an object that refers to 100 other objects through a single property. In the next version context, one of those other objects is replaced by a different object. Thus the collection of links to the original 100 objects ends and a new collection of links to 99 of the original objects plus one new object begins at the next version context.

For multivalued properties, rather than tracking the whole property value collection, if the collection is not ordered, we apply the version tracking attributes to each value in the collection. So in our example, the link to the object dropped from the collection has the current version context added to its endVersion attribute, and the link to the object added has its startVersion set to the current version context. The other 99 links remain unchanged. Note that this means that the actual value of an unordered collection can only be determined by examining all values in the collection since only some of them apply to the current version context.

For multivalued properties that are ordered, the same technique is used as for unordered, except that the tuples representing the historical collection of values must be ordered. If a value is first inserted into one location in a property's list of values, and then moved in a later version to a different location in the list of values, the value is represented by two tuples in the collection representing historical values of the property, once in the initial location with the initial version as startVersion and the later version as endVersion, and again in the later location with the later version as startVersion and no endVersion.

If one were to implement linear versioning, then the algorithm for determining the value of a property within the context of a particular version context would be fairly simple. Firstly, there would be only one endVersion value, so it would be a simple search for a value whose startVersion is less than or equal to the current version context and endVersion is either not set or greater than the current version context. However, with branching, this method no longer works. With branching, one must know all of the version contexts that lead up to this version context and search for values accordingly. This can be a time consuming task. To increase the performance and simplify the process of the present invention, a version context object contains two vital pieces of information:

TABLE II

Version Context Tracking Attributes

| Attribute | Cardinality | Description |
| --- | --- | --- |
| number | 1 . . . 1 | Uniquely identifies this version context. The initial version context in a versioned repository has this value set to 0. When a new version context is created, this attribute is assigned the value <highest-number-so-far> + 1. |
| history | 0 . . . n | Identifies the version contexts that lead up to this one, using the number attribute to do the tracking. While this could be implemented as a collection of numbers, it is better implemented as a bit array where the number is used as an index into the array. If a bit is on, then the version context represented by the bit's index is a prior version context to this one. Also, the bit for the current version context is on. |

Also note that the startVersion and endVersion tracking attributes use the number version context tracking attribute to identify the version context. That is, startVersion and endVersion are not references to version context objects, they are simply integers.

Figure 3:
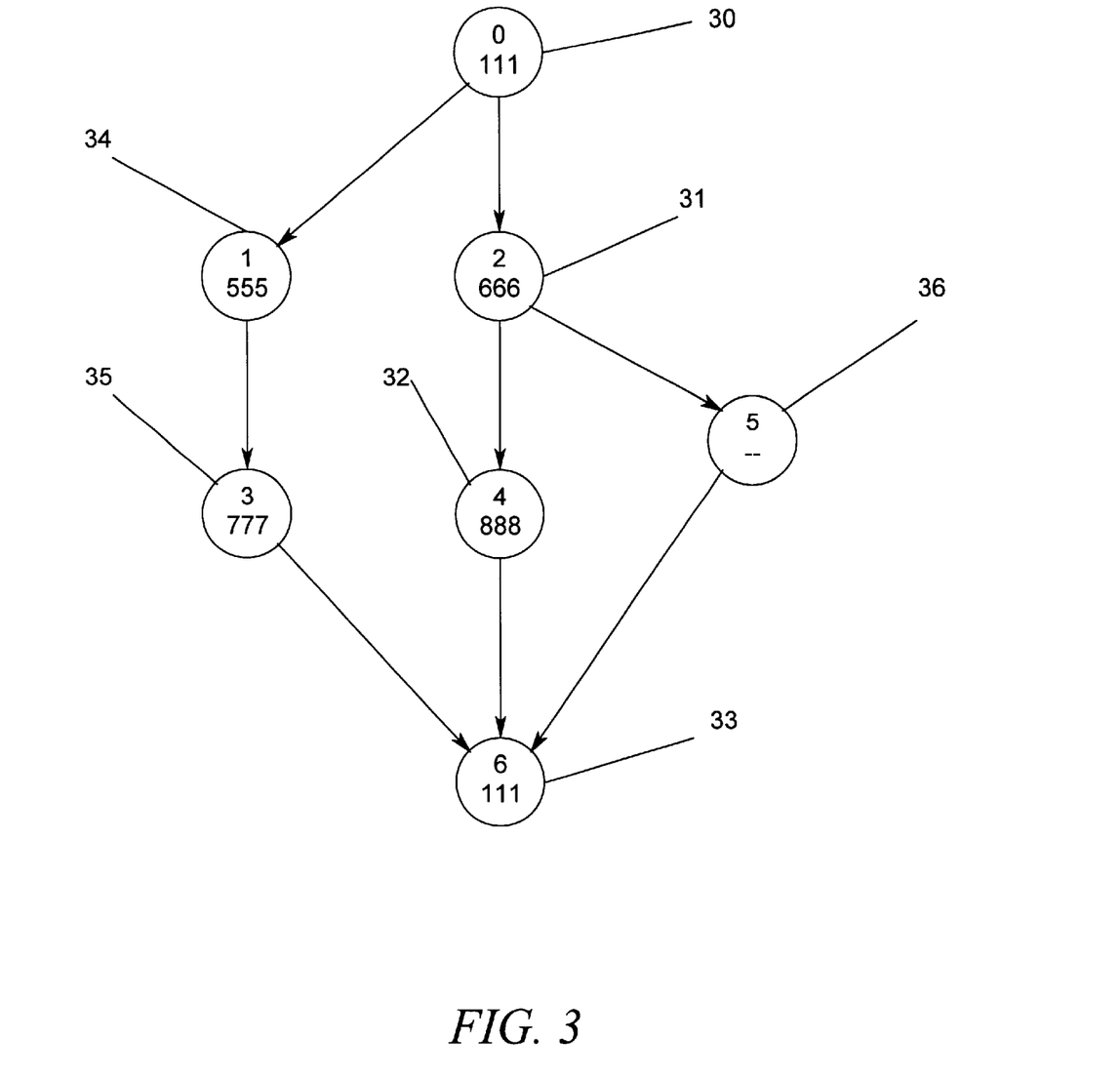
FIG. 3 is a diagram of a basic version tree, which may be implemented by the method of the present invention.

Turning now to an example, FIG. 3 illustrates a set of version contexts that include branching and merging. Table III shows the values of the number and history version context tracking attributes for the version contexts in a version graph where branching has taken place. Version contexts 30, 31, 32 and 33 represent the main line of development. Version contexts 34 and 35 represent one branch or development, and version context 36 represents another. Version context 33 represents the merging of one branch of development back into the mainline.

TABLE III

| Version Context (number) | Object ID's |
| --- | --- |
| 0 | 111 |
| 1 | 555 |
| 2 | 666 |
| 3 | 777 |
| 4 | 888 |
| 5 | — (null) |
| 6 | 111 |

Table IV provides the same information as Table III, but this time using the various tracking attributes. The same version context numbers used in Table III are used to reflect startVersion and endVersion.

TABLE IV

| Property | Value | startVersion | endVersion |
|---|---|---|---|
| d | 111 | 0 | 1,2 |
|   | 555 | 1 | 3 |
|   | 666 | 2 | 4,5 |
|   | 111 | 6 | — (null) |

With reference to FIG. 4, a flow chart of the process used to determine if an item exists within a context is shown. The process begins with a start bubble 40 followed by an inquiry as to whether or not the start version of the item is in the history of the context (decision diamond 41). If the start version of the item is in the history of the context then it is followed by an inquiry as to whether or not any of the end versions of the item are in the history of the context (decision diamond 42). If none of the end versions of the item are in the history of the context then a value of true is returned as depicted by process block 43. On the other hand, if the start version of the item is not in the history of the context then a value of false is returned as depicted by process block 44. Also, if any of the end versions of the item are in the history of the context then a value of false is returned as depicted by process block 44. Finally, the process is existed as denoted by an end bubble 45.

Figure 5:
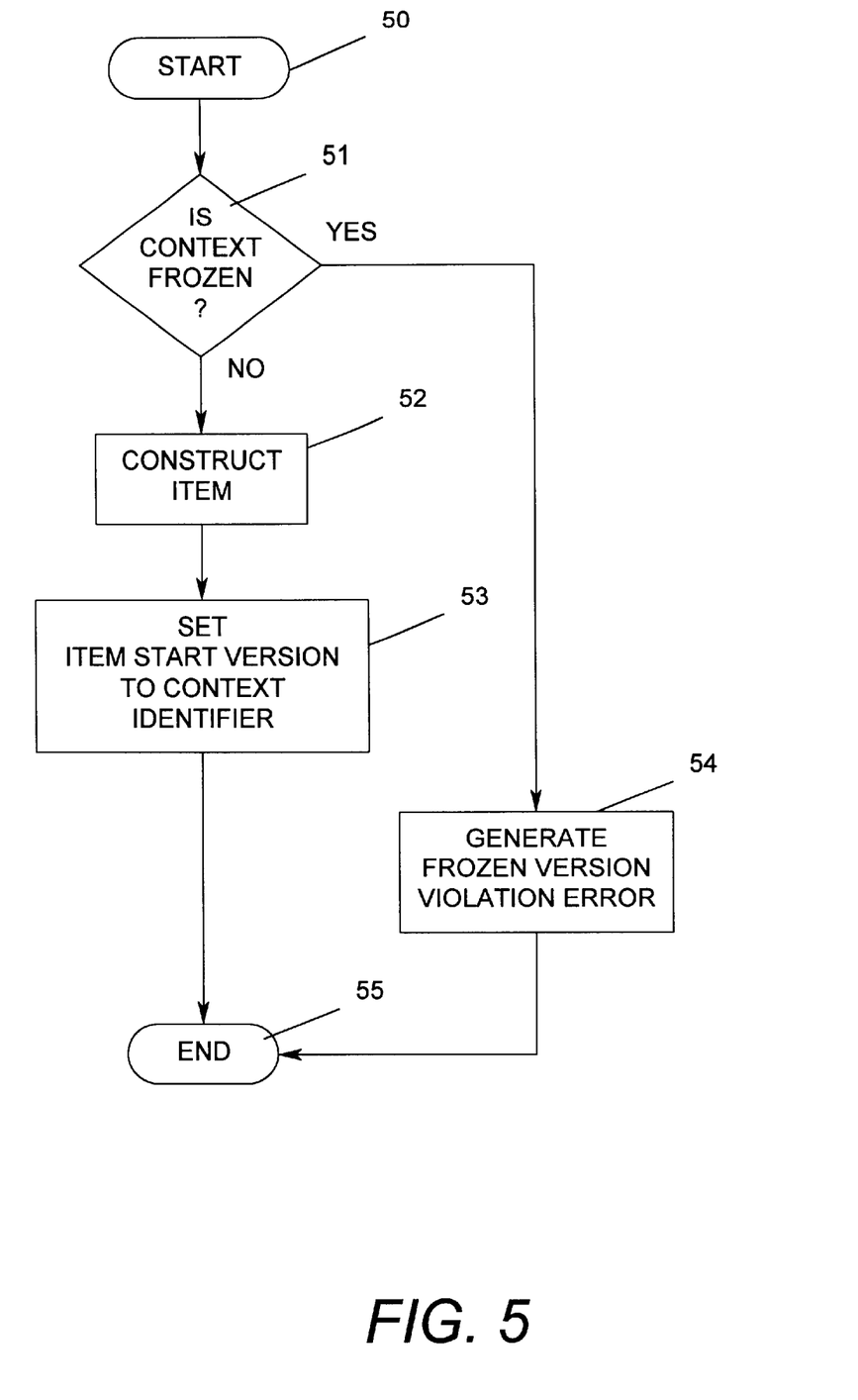
FIG. 5 is a flow chart illustrating the process for creating an item (e.g., object or association) expanded to handle versioning.

With reference to FIG. 5, a flow chart illustrating how the process of creating an item (object or link) is expanded to handle versioning. The process begins with a start bubble 50 followed by an inquiry as to whether or not context is frozen (decision diamond 51). If the context is not frozen, the typical code used to construct the item (object or association) is performed (block 52). After the item is constructed, the start version of the item is set to the identifier of the context (block 53). On the other hand, if the context is frozen, a frozen version violation error is generated as illustrated by process block 54. Finally, the process is exited as denoted by an end bubble 55.

Figure 6:
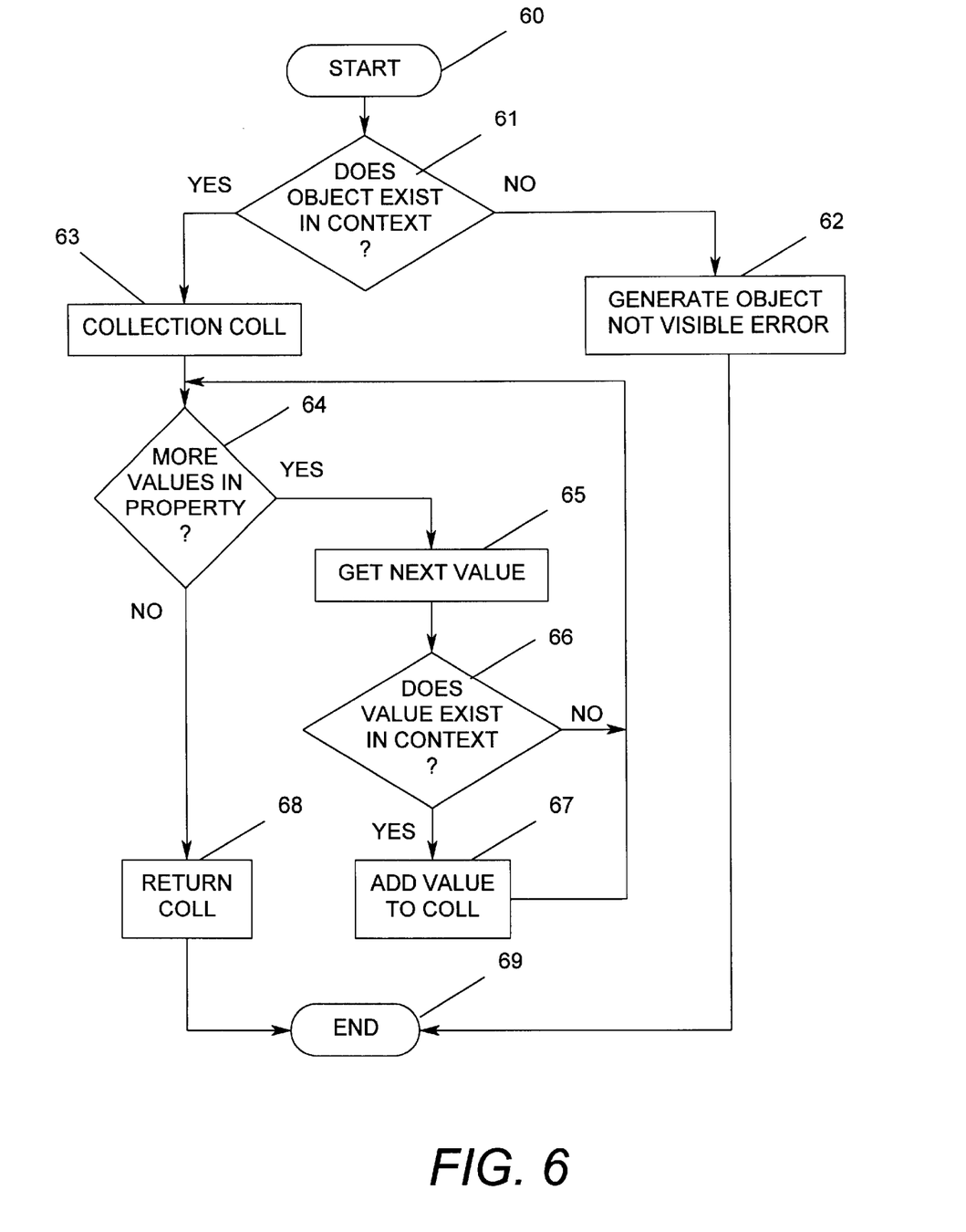
FIG. 6 is a flow chart of the process for returning values of a property that are visible in a version context.

With reference to FIG. 6, a flow chart illustrating the process for returning the values of a property that are visible in a version context. The process begins with a start bubble 60 followed by an inquiry as to whether or not the object exists in the context (decision diamond 61). If the object does not exist in the context, an "object not visible" error is generated (block 62) and the process exits, as denoted by an end bubble 69. On the other hand, if the object does exist in the context, then a collection COLL is declared (data block 63). After the collection is declared, a check is made on the property to see if it contains any values that have not yet been processed (decision diamond 64). If there are more values, the next value is obtained (block 65). If the value obtained exists in the context (decision diamond 66) then it is added to COLL (block 67), and processing continues with the decision of whether or not all values of the property have been processed (decision diamond 64). On the other hand, if the value does not exist in the context, then processing continues with the decision of whether or not all values of the property have been processed (decision diamond 64). Once all property values have been processed, the collection is returned (block 68). Finally, the process is exited as denoted by the end bubble 69.

Figure 7:
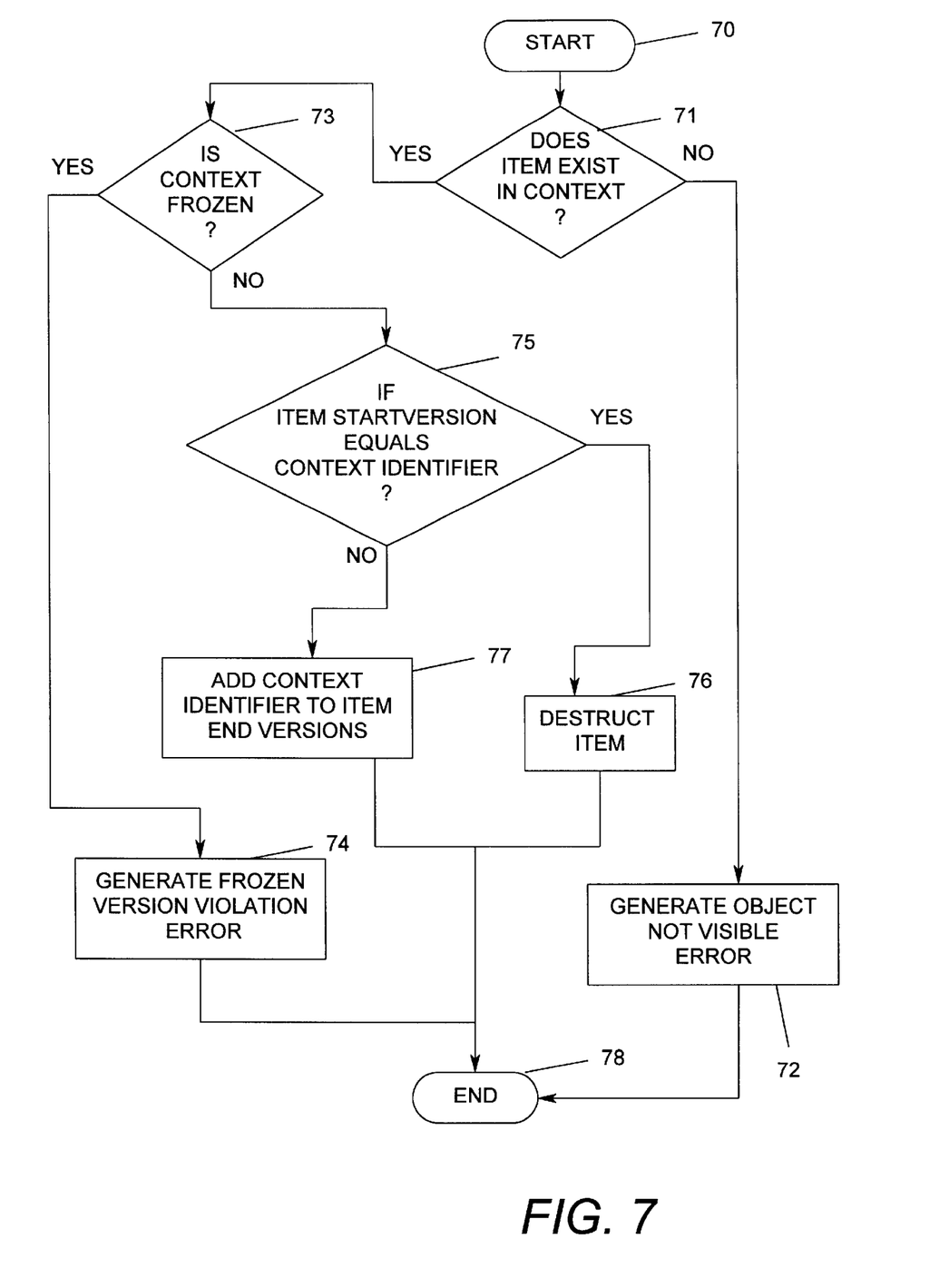
FIG. 7 is a flow chart illustrating the process of deleting an item (e.g., object or association) expanded to handle versioning.

With reference to FIG. 7, a flow chart illustrating how the process of deleting an item (object or link) is expanded to handle versioning. The process begins with a start bubble 70 followed by an inquiry as to whether or not the item exists in the context (decision diamond 71). If the item does not exist in the context, an "object not visible" error is generated (block 72) and the process exits, as denoted by an end bubble 78. If the item does exist in the context however, processing continues to determine if the context is frozen (decision diamond 73). If the context is frozen a frozen context violation error is generated (block 74) and the process exits, bubble 78. If the context is not frozen, a determination is made of whether the start version of the item equals the identifier of the context (decision box 75). If it does, then the typical code to destruct the item is performed (block 76). If it does not, the context identifier is added to the end versions for the item (block 77). In either case, the process exits as denoted by the end bubble 78.

Figure 8A:
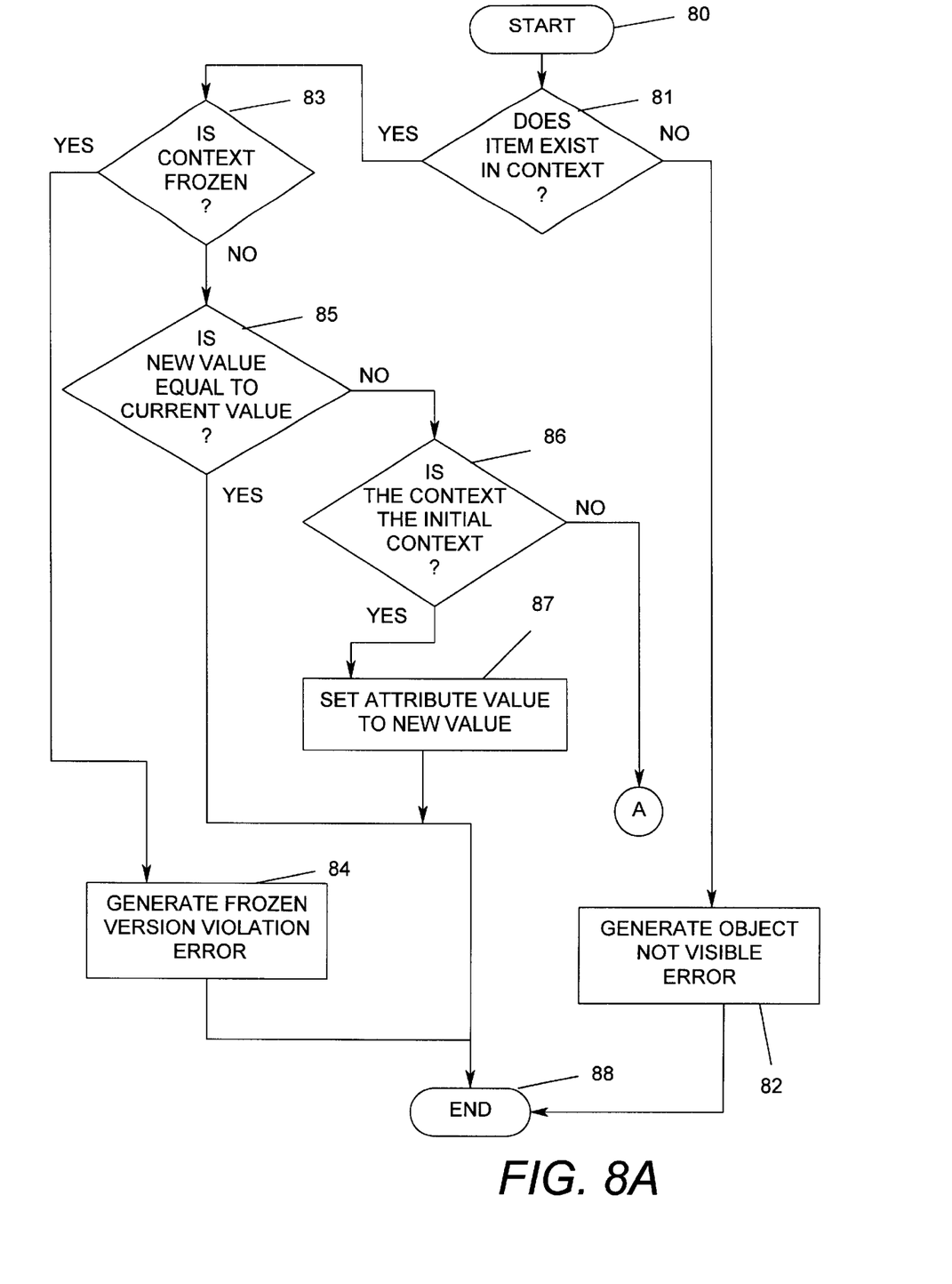
FIGS. 8A and 8B combined form a flow chart illustrating the process of setting a property value of an object expanded to handle versioning.

With reference to FIG. 8A, a flow chart illustrating how the process of setting a property value of an object is expanded to handle versioning. The process begins with a start bubble 80 followed by an inquiry as to whether the object exists in the context (decision diamond 81). If the object does not exist in the context, an "object not visible" error is generated (block 82) and the process exits, as denoted by an end bubble 88. If the object does exist in the context, processing continues to determine if the context is frozen (decision diamond 83). If the context is frozen, a frozen context violation error is generated (block 84) and then the process exits, bubble 41. If the context is not frozen, a determination is made as to whether or not the new value is equal to the current value of the property (decision diamond 85). If it is, processing exits as denoted by the end bubble 88. If the new value is not the same as the current value of the property, a decision is made as to whether the context is the initial context (decision diamond 86). If it is, the attribute is set to the new value (block 87). If not, processing continues in FIG. 8B as indicated by a connector circle A.

Figure 8B:
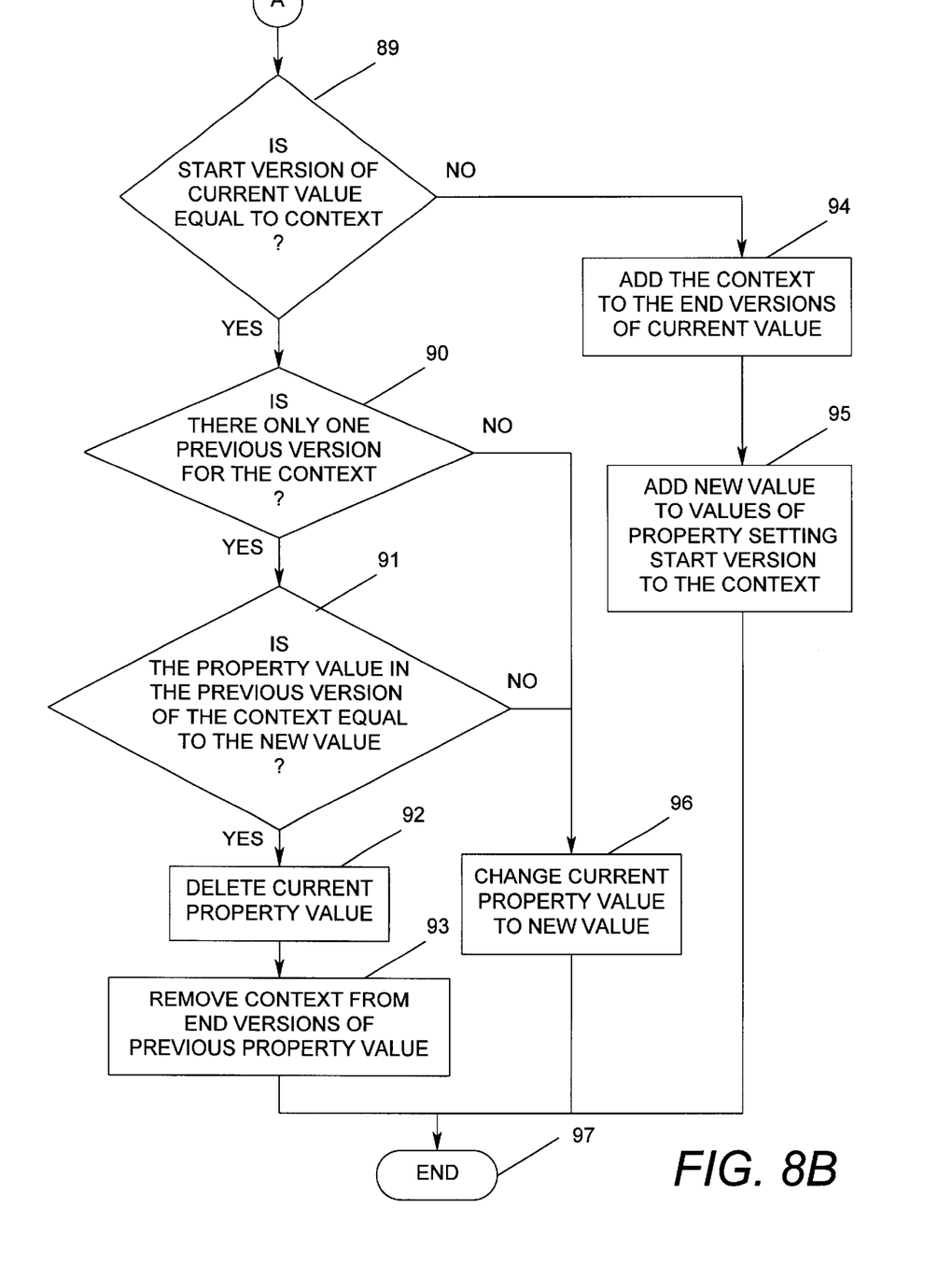

Referring now to FIG. 8B at the connector A, an inquiry is made as to whether or not the start version of the current value is equal to the context (decision diamond 89), then if there is only one previous version for the context (decision diamond 90), then if the property value in the previous version of the context is the same as the new property value (decision diamond 91), then the current value of the property is deleted (block 92) and the context is removed from the end versions of the previous property value (block 93). If there is more than one previous version for the context (diamond 90) or the property value is not the same as the previous property value (diamond 91), then the value of the current property value is changed to be the new value (block 96). In either case, processing terminates as denoted by an end bubble 97. If the start version of the current property value is not the same as the context (diamond 89), then the context is added to the end versions of the current property value (block 94) and the new value is added to the property values with the context as the start version of the new value (block 95. Processing then terminates as denoted by the end bubble 97.

Figure 9:
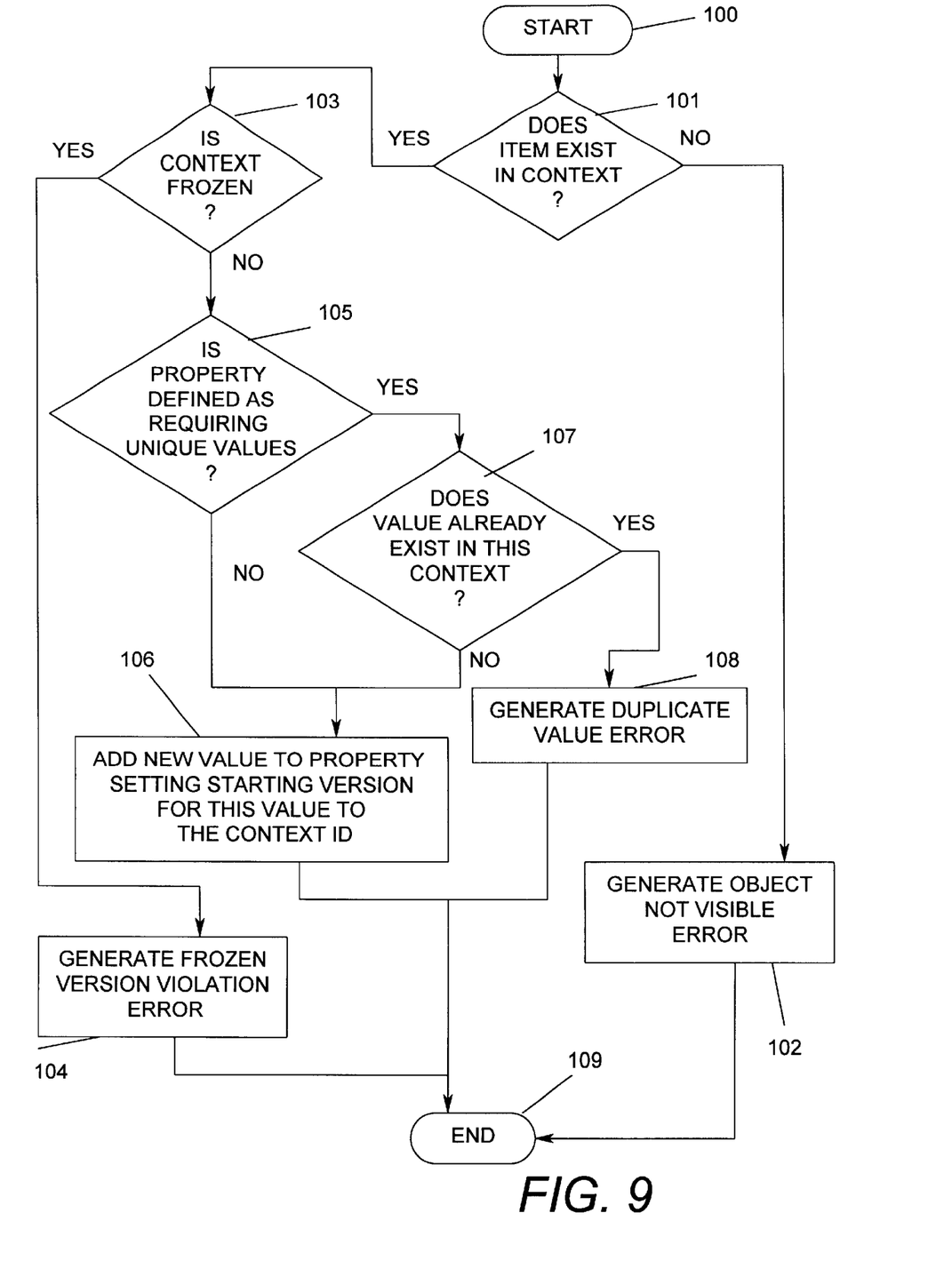
FIG. 9 is a flow chart illustrating the process for adding a value to the existing values of a multivalued property within a given version context.

With reference to FIG. 9, a flow chart illustrating the process for adding a value to the existing values of a multivalued property within a given version context is shown. The process begins with a start bubble 100, followed by an inquiry as to whether or not the object exists in the context (decision diamond 101). If the object does not exist in the context, an "object not visible" error is generated (block 102) and the process exits, as denoted by an end bubble 109. On the other hand, if the object does exist in the context then processing continues to determine if the context is frozen (decision diamond 103). If the context is frozen, a frozen context violation error is generated (block 104) and the process exits, bubble 109. If the context is not frozen, processing continues to determine if the property is defined as requiring unique values (decision diamond 105). If the property does not require unique values, then the new value is added to the values of the property, setting the starting version for the new property value to the id number of the current version context (block 106). If the property requires unique values, the processing continues to determine if the property already contains the value (decision diamond 107). If it does, a duplicate value error is generated (process box 108) and processing exits (end bubble 109). If the property does not already contain that value, the new value is added to the values of the property, setting the starting version for the new property value to the id number of the current version context (block 106). Processing then ends as denoted by the end bubble 109.

Figure 10:
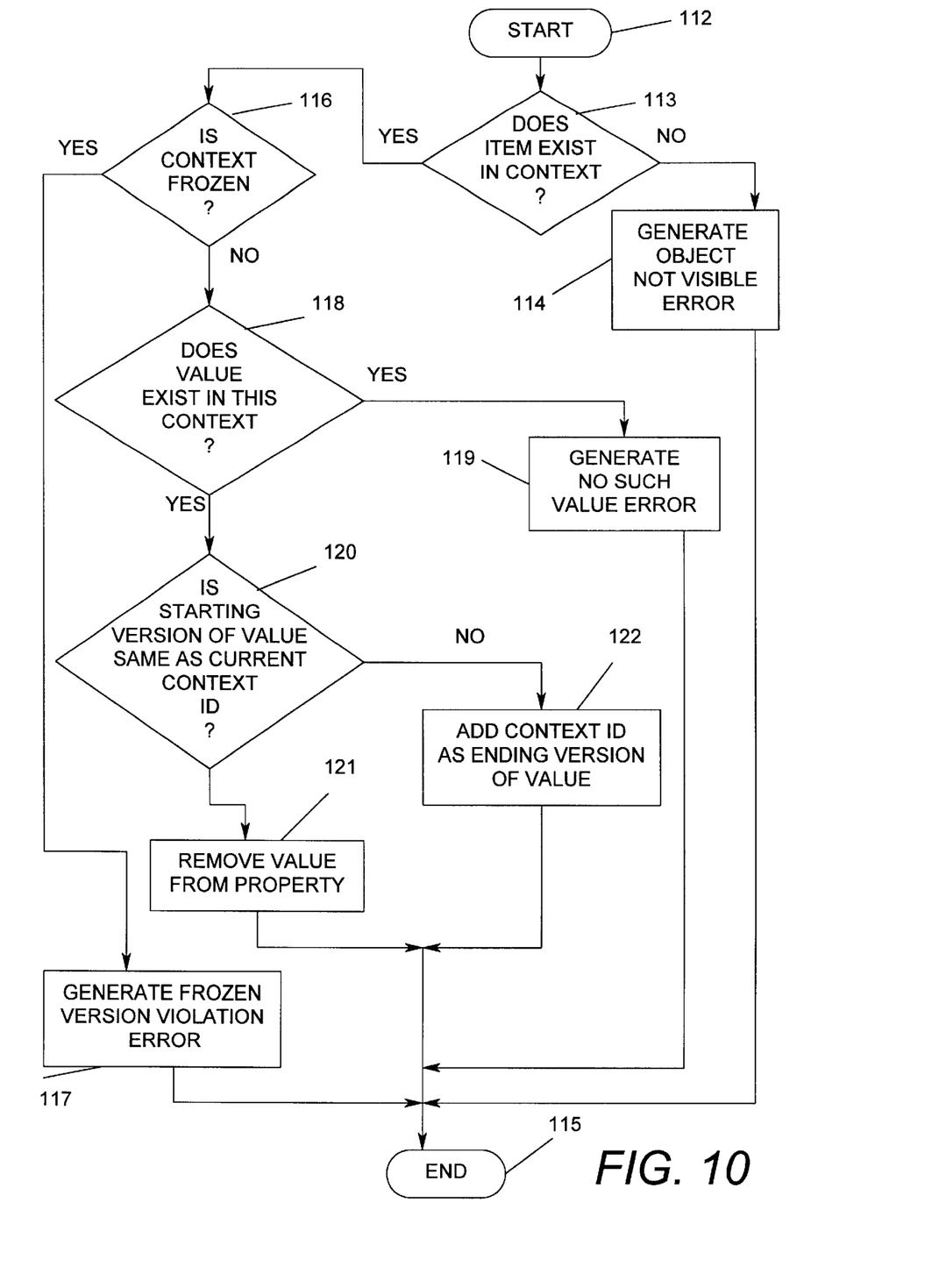
FIG. 10 is a flow chart illustrating the process for removing an exiting existing value of a multivalued property within a given version context.

With reference to FIG. 10, the process for removing an existing value of a multivalued property within a given version context is shown. The process begins with a start bubble 112, followed by an inquiry as to whether or not the object exists in the context (decision diamond 113). If the object does not exist in the context, an "object not visible" error is generated (block 114) and the process exits, as denoted by an end bubble 115. On the other hand, if the object does exist in the context then processing continues to determine if the context is frozen (decision diamond 116). If the context is frozen, a frozen context violation error is generated (block 117) and the process exits, bubble 115. If the context is not frozen, processing continues to determine if the property contains the value to be modified (decision diamond 118). If the property does not contain the value to modify, a no such value error is generated (block 119). If the property does contain the value, processing continues to determine if the starting version if the exiting value is the same as the context id (decision diamond 120). If they are the same, the existing value is deleted from the values of the property (block 121). If they are not the same, the context id is added to the ending versions of the existing value (block 122). Processing then terminates as indicated by the end bubble 115.

Figure 11:
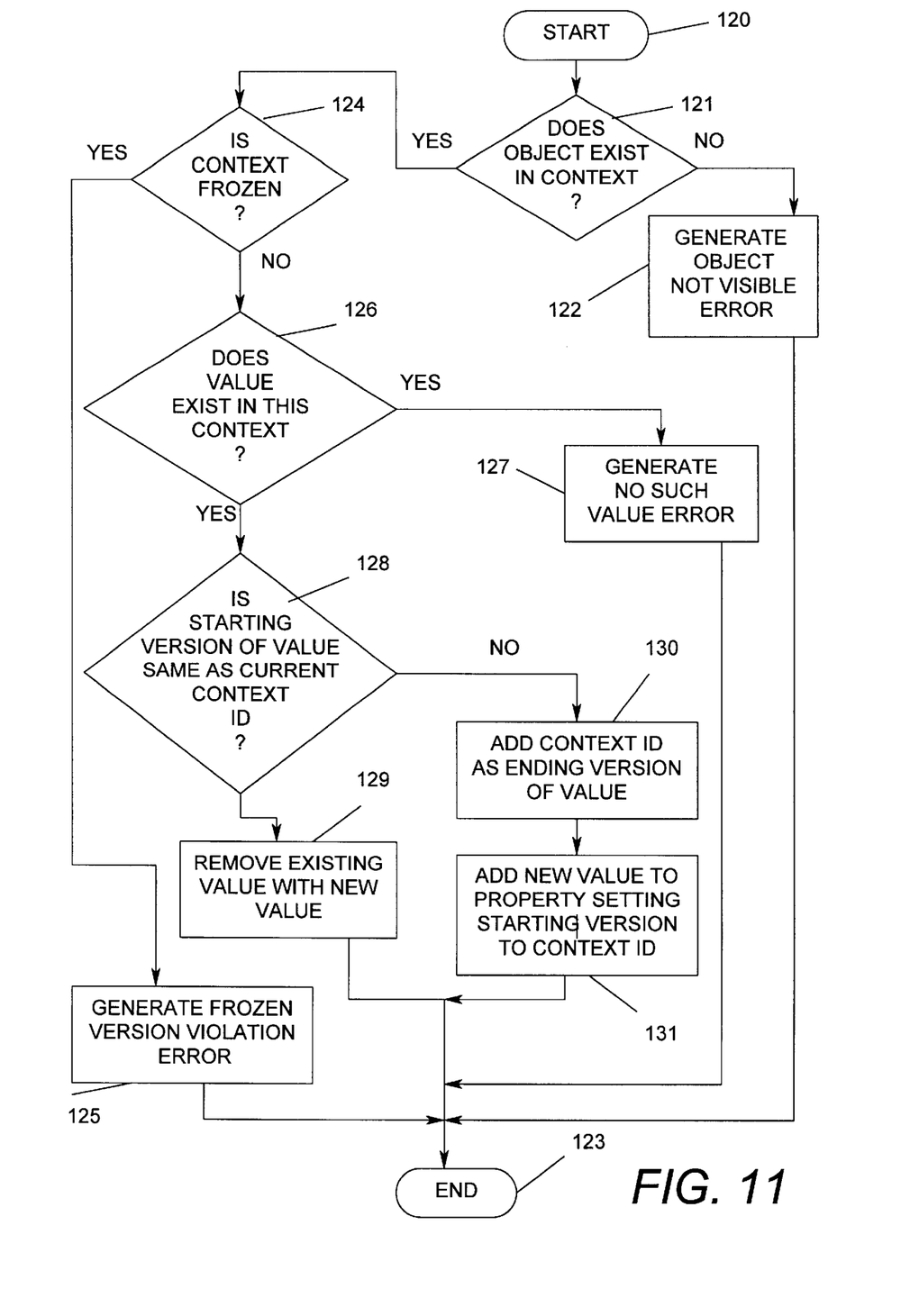
FIG. 11 is a flow chart illustrating the process for replacing an exiting existing value of a multivalued property with a new value within a given version context.

With reference to FIG. 11, the process for replacing an exiting existing value of a multivalued property with a new value within a given version context is shown The process begins with a start bubble 120, followed by an inquiry as to whether or not the object exists in the context (decision diamond 121). If the object does not exist in the context, an "object not visible" error is generated (block 122) and the process exits, as denoted by an end bubble 123. On the other hand, if the object does exist in the context then processing continues to determine if the context is frozen (decision diamond 124). If the context is frozen, a frozen context violation error is generated (block 125) and the process exits, bubble 124. If the context is not frozen, processing continues to determine if the the value exists in this context (decision diamond 126). If the property does not contain the value to modify, a no such value error is generated (process box 127). If the property does contain the value, processing continues to determine if the starting version of the exiting value is the same as the context id (decision diamond 128). If they are the same, the current value is changed to be the new value (block 129). If they are not the same, the context id is added to the ending versions of the existing value (block 130) and the new value is added to the values of the property, with the starting version of the new value set to the context id (block 131). Processing then terminates as indicated by the end bubble 123.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. An improved computer-implemented method for maintaining a version history of objects in a repository, wherein modifications to property values and links are tracked with respect to versions of a model, said method comprising the steps of:

a. for each object in said model, maintaining a start version and a list of end versions thereof;

b. for each attribute value in said model, maintaining a start version and a list of end versions thereof;

c. in response to a request for objects in a class with respect to a current version, retrieving only those objects whose start version is in the history of said current version and whose end versions are not in the history of said current version; and d. in response to a request for attribute values of an object with respect to a current version, retrieving only those values whose start version is in the history of said current version and whose end versions are not in the history of said current version.

2. The method as in claim 1 further comprising the steps of:

e. for each link in said model, maintaining a start version and a list of end versions thereof; and, f. in response to a request for links in an association with respect to a current version, retrieving only those links whose start version is in the history of said current version and whose end versions are not in the history of said current version.

3. The method as in claim 1 where step a thereof further includes, upon construction of an object, the step of setting start version of said object to identify current version.

4. The method as in claim 1 where step d thereof further includes the steps of:

e. determining if said object exists in said current version, and if not;

f. generating an object not visible error.

5. The method as in claim 1 where step a thereof further includes, upon deletion of an object with respect to a current version, the steps of:

e. determining if start version of said object equals said current version, and if so;

f. destructing said object;

g. if start version of said object does not equal said current version, as determined in step a hereof, adding identification of said current version to said list of end versions of said object.

6. The method as in claim 5 further including the steps of:

h. determining if said object exists in said current version, and if not;

e. generating an object not visible error.

7. The method as in claim 1 where step b thereof further includes, upon setting an attribute of an object to a new value with respect to a current version, the steps of:

e. determining if said new value is equal to the current value of said attribute, and if not;

f. determining if start version of said current value is equal to said current version, and if not;

g. adding said current version to said list of end versions of current value; and, h. adding said new value to values of said attribute and setting said start version to said current version.

8. The method as in claim 7 where step d it is determined that said start version of said current version is equal to said current version, further including the steps of:

i. determining if the attribute value in the previous version of said current version is equal to said new value, and if so;

j. deleting said current value; and, k. removing said current version from said list of end versions of said attribute value in the previous version.

9. The method as in claim 8 where in step a it is determined that the attribute value in the previous version of said current version is not equal to said new value, changing current property value to said new value.

10. The method as in claim 7 further include the steps of:

i. determining if said object exists in said current version, and if not;

e. generating an object not visible error.

11. The method as in claim 1, where step b thereof further includes, upon adding a new value to the existing values of a multi-valued attribute of an object with respect to a current version, the steps of:

e. where said attribute requires unique values, determining if said new value is already listed as a value of said attribute in said current version, and if yes generating a duplicate value error;

f. and if not, adding said new value to said attribute and setting said starting version to said current version.

12. The method as in claim 11 further include the steps of:

g. determining if said object exists in said current version, and if not;

e. generating an object not visible error.

13. The method as in claim 1, where step b thereof further includes, upon removing a value from the existing values of a multi-valued attribute of an object with respect to a current version, the steps of:

e. determining if said value is listed as a value of said attribute in said current version, and if not generating a no such value error;

f. and if yes, determining if start version of said value is equal to said current version, and if so, removing said value from said list of attribute values;

g. and if not, adding said current version to said list of end versions of said value.

14. The method as in claim 13 further include the steps of:

h. determining if said object exists in said current version, and if not;

i. generating an object not visible error.

15. The method as in claim 1, where step b thereof, for a multi-valued attribute of an object, upon replacing an old value with a new value with respect to a current version, further includes the steps of:

e. determining if said old value is listed as a value of said attribute in said current version, and if not generating a no such value error;

f. and if yes, determining if start version of said old value is equal to said current version, and if so, replacing said old value with said new value within said list of attribute values;

g. and if not, adding said current version to said list of end versions of said old value; and, h. adding said new value to said list of attribute values and setting said start version to said current version.

16. The method as in claim 15 further including the steps of:

i. determining if said object exists in said current version, and if not;

j. generating an object not visible error.

17. The method as in claim 2 where step e thereof further includes, upon creation of an link, the step of setting start version of said link to identify current version.

18. The method as in claim 2 where step e thereof further includes, upon deletion of a link with respect to a current version, the steps of:

g. determining if start version of said link equals said current version, and if so;

h. removing said link;

i. if start version of said link does not equal said current version, as determined in step g hereof, adding identification of said current version to said list of end versions of said link.

19. The method as in claim 18 further including the steps of:

j. determining if said link exists in said current version, and if not;

k. generating a link not visible error.

* * * * *